United States Patent [19]

Caron et al.

[11] Patent Number: 4,846,564
[45] Date of Patent: Jul. 11, 1989

[54] PACKAGING A BARE OPTICAL FIBER INTERCONNECTION

[75] Inventors: Bernard G. Caron; John C. Hoffer, both of Harrisburg, Pa.

[73] Assignee: AMP Incorporated, Harrisburg, Pa.

[21] Appl. No.: 214,999

[22] Filed: Jul. 5, 1988

[51] Int. Cl.$^4$ .................................................. G02B 6/36
[52] U.S. Cl. ................................ 350/96.20; 350/96.21
[58] Field of Search ................ 350/96.20, 96.21, 96.22

[56] References Cited

U.S. PATENT DOCUMENTS

| | | | |
|---|---|---|---|
| 4,291,940 | 9/1981 | Kawasaki et al. | 350/96.15 |
| 4,645,296 | 2/1987 | Cattin et al. | 350/96.21 |
| 4,679,895 | 7/1987 | Huber | 350/96.20 |
| 4,714,316 | 12/1987 | Moore et al. | 350/96.20 |
| 4,752,109 | 6/1988 | Gordon et al. | 350/96.20 |
| 4,773,725 | 9/1988 | Ashman et al. | 350/96.20 |

OTHER PUBLICATIONS

AMP Incorporated, IS2969; 12-10-87, Instruction Sheet.
AMP Optimate Fiber Optic Interconnecting System; catalog 83-718; Issued 3-85, AMP Incorporated.

*Primary Examiner*—John D. Lee
*Assistant Examiner*—Phan T. Heartney
*Attorney, Agent, or Firm*—Gerald K. Kita

[57] ABSTRACT

Packaging 8 for an optical component 1 interconnected with a bare optical fiber 2,3, comprising; a flexible tubular sheath 13 encircling strength members 14 extending axially of the sheath 13, tubing 15 within the sheath 13 for receiving a bare optical fiber 2,3 interconnected to an optical component 1, a ferrule 18 to which the strength members 14 are anchored, a sleeve 16 for clamping the strength members 14 against the ferrule 18, a shrinkable sleeve 17 for gripping the sleeve 16 and a portion of the sheath 13, a housing 10 for assembly over the optical component 1 and for anchoring the ferrule 18, and an optical connector 12 for connection to a corresponding bare optical fiber 2,3 emergent from an end 23 of the sheath 13.

11 Claims, 4 Drawing Sheets

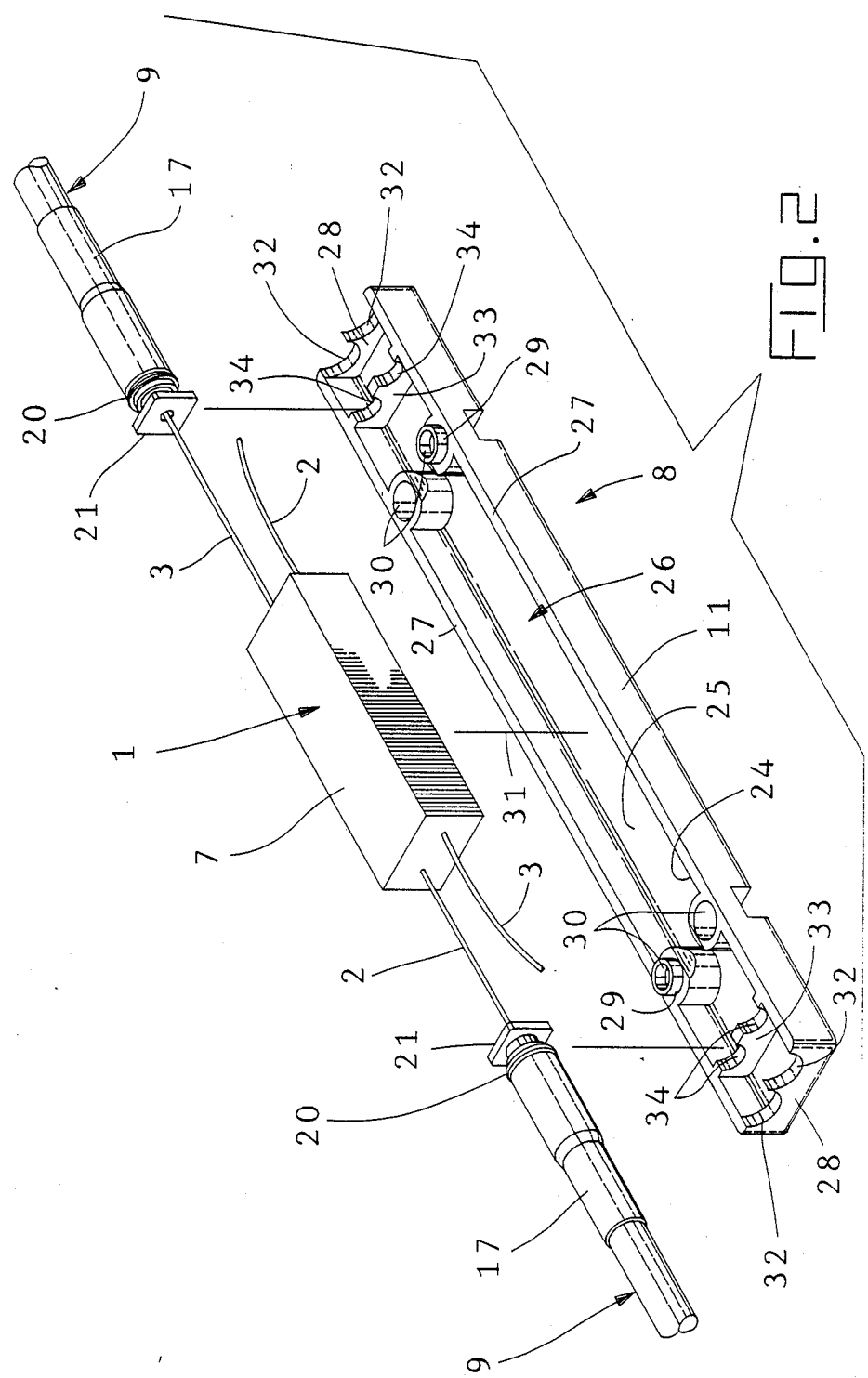

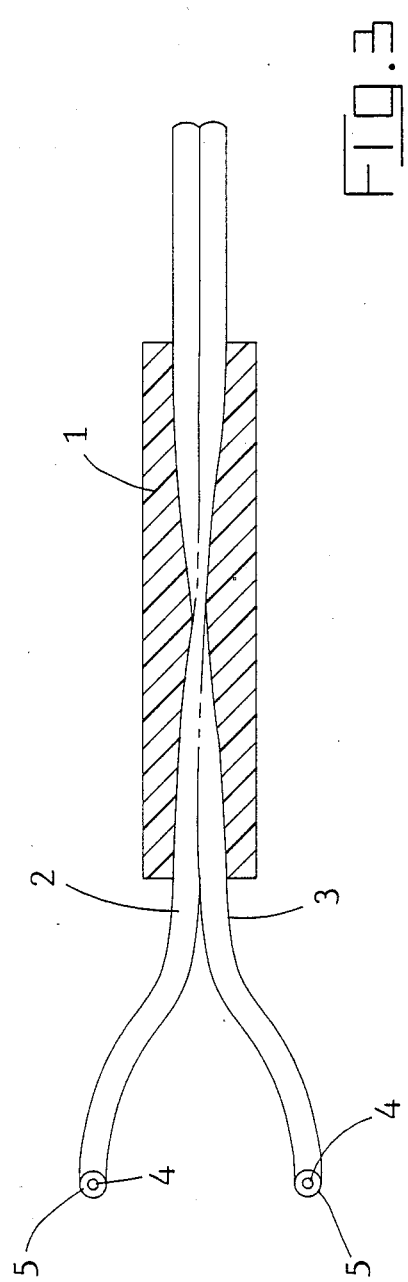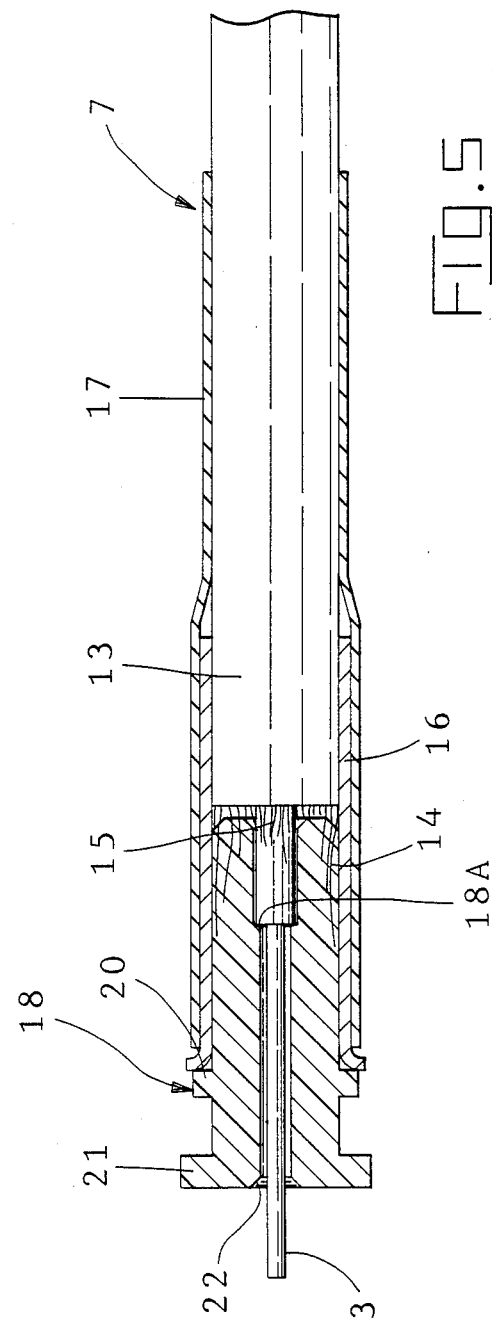

PACKAGING A BARE OPTICAL FIBER INTERCONNECTION

FIELD OF THE INVENTION

The invention relates to packaging for protecting a bare optical fiber interconnected to an optical component.

BACKGROUND OF THE INVENTION

In an optical communications system, communications signals in the form of optical energy are transmitted along an optical fiber cable. The cable provides a communications link among various optical components of the system. Because an optical fiber of the cable is readily damaged, the fiber must be enclosed. For example the fiber is enclosed and protected by an outer jacket of the cable. Any of the various optical components of the system may include an interconnection with a bare optical fiber, namely a fiber that is not enclosed in a cable or other protective packaging. The bare optical fiber provides a convenient means of linking the component to the optical fiber cable.

An optical component may be one of various types. For example, U.S. Pat. No. 4,752,109 discloses a component known as a source interconnected with a bare optical fiber. Packaging for the bare optical fiber includes a metal tube in which the fiber is contained. U.S. Pat. No. 4,186,996 discloses a component known as a detector interconnected with a bare optical fiber. Packaging for the fiber includes a resilient ferrule. U.S. Pat. No. 4,291,940 discloses a component known as a coupler, wherein a component comprises a bare optical fiber interconnected with another bare optical fiber. The coupler is supplied without packaging for protecting the bare optical fibers of the coupler. Each of the patents discloses an optical component interconnected with a bare optical fiber for which packaging is needed for protecting the bare optical fiber.

SUMMARY OF THE INVENTION

A method and apparatus of the invention are employed with packaging for assembly over an optical component and a bare optical fiber to which the component is interconnected. The component may be a coupler, a source, a detector or other type of component, which is supplied without packaging, or which is supplied with packaging that can be replaced by packaging as employed according to the invention.

According to the invention, packaging for protecting the bare optical fiber to which an optical component is interconnected, is employed with a flexible tubular sheath anchored to a rigid ferrule, a bare optical fiber of the optical component is inserted along a hollow interior of the ferrule and along the interior of the sheath, a housing is assembled over the optical component, and the ferrule is anchored to the housing.

According to the invention, a method for packaging an optical component coupled to a bare optical fiber, comprises the steps of; assembling a flexible tubular sheath over strands of tensile members extending axially of the sheath, anchoring the tensile members onto a rigid ferrule, inserting a bare optical fiber of the optical component along a hollow interior of the ferrule and along the interior of the flexible tubular sheath, assembling a housing over the optical component, and anchoring the ferrule to the housing.

A description of the invention will be described by way of example with reference to accompanying drawings.

DESCRIPTION OF THE DRAWINGS

FIG. 2 is a fragmentary perspective view of the optical component and packaging with parts shown separated from one another.

FIG. 3 is an elevation view in section of an optical component of the type known as a coupler.

FIG. 5 is a fragmentary elevation view in section of an assembly of the parts shown in FIG. 3.

With reference to FIG. 3, an optical component 1, is in the form of a coupler, known from U.S. Pat. No. 4,291,940, and comprising a first optical fiber 2 and a second optical fiber 3, of graded index multimode type, not shown, or of stepped index multimode type having an optical core 4 and a cladding 5. A section 6 of both fibers 2,3 are fused together and may be twisted around one another. The fused section 6 is encapsulated by a rectangular block 7 of plastic material. The block 7 protects the fused section 6 from damage due to rough handling. The fibers 2,3 are flexible and are uncovered, bare fibers 2,3 susceptible to damage.

With reference to FIGS. 1 and 2, packaging 8 for the optical component 1 protects the bare fibers 2,3 and the component 1. The packaging 8 includes a cover 9 for each of the fibers 2,3 and a rigid housing 10 assembled from two duplicate housing portions 11,11. The housing 10 is assembled to enclose and cover the optical component 1, including portions of the bare fibers 2,3. Each of the bare fibers 2,3 projects from the housing 10 and extends along a corresponding cover 9, and is connected with a known optical connector 12 mounted to an end of the corresponding cover 9.

With reference to FIGS. 4 and 5, the corresponding cover 9 includes a flexible tubular sheath 13 encircling strands of tensile strength members 14 extending axially of the sheath 13. The strength members 14 are slender elongated fibers of a high tensile strength material such as KEVLAR, a trademark of E. I. Du Pont de Nemours & Company, Wilmington, Del. The sheath 13 and strength members 14 are known and used in industry for fabrication of an optical fiber cable, not shown, wherein an optical fiber is encircled by the sheath and strength members. In place of an optical fiber, a flexible tubing 15 is encircled by the sheath 13. The strength members 14 are distributed along the cylindrical exterior of the tubing 15.

Figure 1:
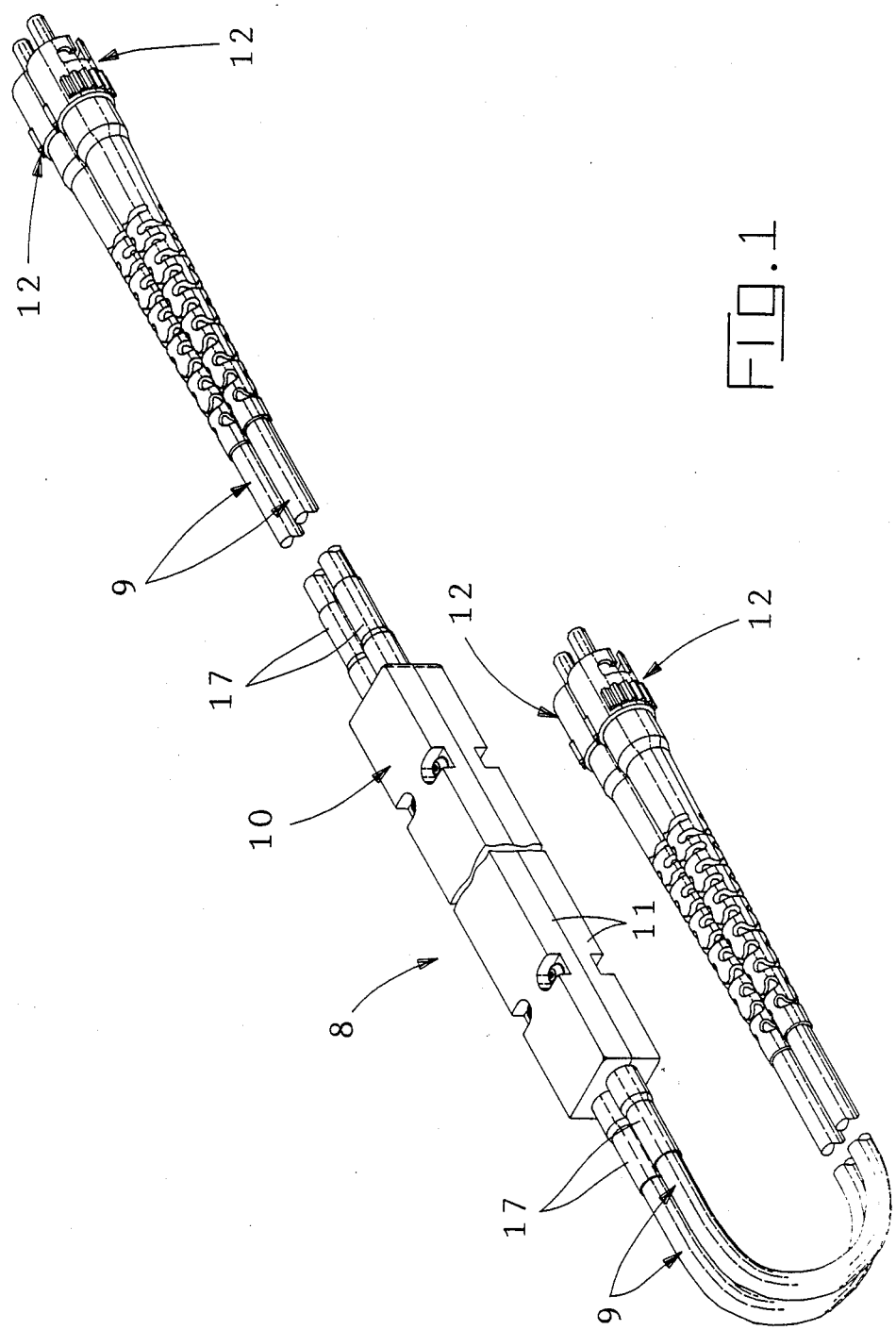
FIG. 1 is a fragmentary perspective view of an optical component and packaging for the component.

The corresponding cover 9 includes further a radially deformable metal crimp sleeve 16, a length of shrinkable tubing 17 that is radially shrinkable, and a rigid ferrule 18. The ferrule 18 is machined from metal, and has a cylindrical exterior provided with knurling 19, a radially projecting exterior flange 20 adjacent the knurling 18, an enlarged radially extending end flange 21 at an end of the ferrule and a passageway 22 extending axially of the ferrule 18.

Figure 4:
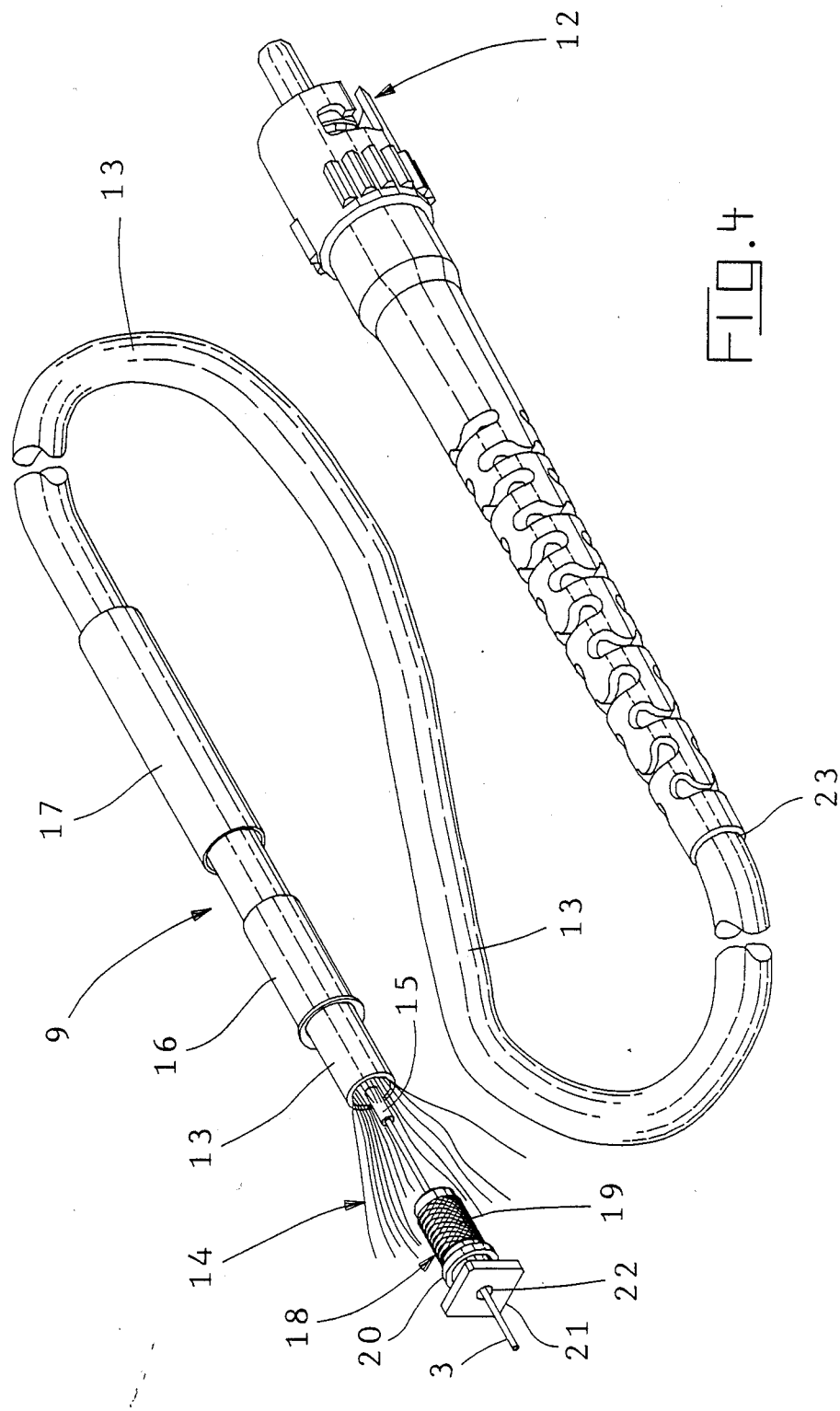
FIG. 4 is a fragmentary perspective view of a strain relief and cover, with parts shown separated from one another, for a bare optical fiber of the optical component.

FIG. 4 illustrates the cover 9 partially assembled. With reference to FIG. 5, the ferrule 18 is assembled by inserting an end of the tubing 15 within the passageway 22 until an internal shoulder 18A of the ferrule 18 abuts an end of the tubing 15. The strength members 14 become distributed over the knurling 19 upon movement of the crimp sleeve 16 from a position shown in FIG. 4 to a position shown in FIG. 5 engaging the flange 20 and concentrically encircling the strength members 14 and the ferrule 18, and encircling an end portion of the sheath 13. The crimp sleeve 16 is radially crimped in a known manner to clamp the strength members 14 against the ferrule 18 and to grip the end portion of the sheath 13. Thereby the sheath 13 and strength members 14 are anchored to the ferrule 18. The shrinkable tubing 17 is moved to encircle the crimp sleeve 16 and is positioned with an end adjacent to the flange 20. The shrinkable tubing 17 is shrunk radially by the application of heat to grip the crimp sleeve 16 and the end portion of the sheath 13 to provide a strain relief. The corresponding cover 9 is assembled over a fiber, such as the fiber 3. The fiber 3 is inserted along a reduced diameter portion of the passageway 22 of the ferrule 18 which guides the fiber 3 into an end of the tubing 15 without stubbing or hitting the fiber 3 against an end of the tubing 15. The fiber 3 is inserted along the interior of the tubing 15 until emerging from an end 23 of the sheath 13 for connection in a known manner to a corresponding optical connector 12.

With reference to FIGS. 1 and 2, each duplicate housing portion 11 includes a cavity 24 between a bottom wall 25 and an opposite open side 26, side walls 27,27 along the open side 26 and projecting from the bottom wall 25 and end walls 28,28 connected to and between the side walls 27,27 and extending along the open side 26 and projecting from the bottom wall 25. Each side wall 27 includes a projecting peg 29 extending past the open side 26, and an opening 30 communicating with the open side 26. The housing portion 11 has a construction that is symmetrical about a center axis 31, such that two duplicate housing portions 11,11 will fit together in an assembly with pegs 29,29 of one housing portion 11 received in corresponding openings 30,30 of the other housing portion 11. The housing portions 11,11 are secured together by adhesive, not shown. Each peg 29 is hollow to extend a corresponding opening 30 through a corresponding peg 29 and through the bottom walls 25,25 of the housing 10. Each opening 30 is reduced in diameter through a corresponding peg 29. The housing 10 can be mounted by a fastener, not shown, received through the corresponding opening 30.

The component 1 is mounted in the cavity 24 with each fiber 2,3 extending through a corresponding end wall 28. Each end wall 28 includes a semicircular recess 32 in which nests a corresponding covered fiber 2,3, namely a fiber 2,3 that is covered by a cover 9. The end wall 28 engages a corresponding tubing 17 that provides a strain relief for the corresponding covered fiber 2,3. The number of covered fibers 2,3 will vary depending upon the type of optical component 1 to be enclosed by the housing 10. An interior wall 33 adjacent each end wall 28 is provided with a semicircular recess 34 in which nests a corresponding covered fiber 2,3. The interior wall 33 fits in a space between the flanges 20,21 of a corresponding ferrule 18 to anchor the ferrule 18 and a corresponding cover and strain relief 9 against movement.

We claim:

1. A method for packaging an optical component interconnected with a bare optical fiber, comprising the steps of; assembling flexible tubing sheath over strands of strength members extending axially of the sheath, anchoring the tensile members onto a rigid ferrule,
   inserting a bare optical fiber of the optical component along a hollow interior of the ferrule and along the interior of the flexible tubular sheath,
   assembling a housing over the optical component, and anchoring the ferrule to the housing.

2. A method as recited in claim 1, and further including the step of; inserting a bare optical fiber of the optical component along a flexible tube extending axially within the sheath.

3. A method as recited in claim 1, and further including the step of; clamping the strength members to the ferrule, and applying shrinkable tubing over an end of the sheath.

4. A method as recited in claim 1, and further including the step of; connecting an optical connector on the optical fiber emerging from an end of the sheath.

5. A method as recited in claim 2, and further including the step of; connecting an optical connector on the optical fiber emerging from an end of the sheath.

6. A method as recited in claim 3, and further including the step of; connecting an optical connector on the optical fiber emerging from an end of the sheath.

7. A method as recited in claim 2, and further including the step of; clamping the strength members to the ferrule and, and applying shrinkable tubing over an end of the sheath.

8. A kit of parts for packaging an optical component interconnected with a bare optical fiber, comprising; a flexible tubular sheath encircling strength members extending axially of the sheath, tubing within the sheath for receiving a bare optical fiber interconnected to an optical component, a ferrule to which the strength members are anchored, a housing for assembly over the optical component and for anchoring the ferrule, and an optical connector for connection to a corresponding bare optical fiber emergent from an end of the sheath.

9. A kit of parts as recited in claim 8, comprising; a sleeve for clamping the strength members against the ferrule, and a shrinkable sleeve for gripping the sleeve and a portion of the sheath.

10. A kit of parts as recited in claim 8, comprising; fastener receiving openings extending through the housing.

11. A kit of parts as recited in claim 8, comprising; the housing includes duplicate housing portions for assembly together.

* * * * *